United States Patent [19]
Mohler

[11] 3,966,325
[45] June 29, 1976

[54] LASER POWER METER

[75] Inventor: Galen E. Mohler, Mountain View, Calif.

[73] Assignee: Lexel Corporation, Palo Alto, Calif.

[22] Filed: Mar. 31, 1975

[21] Appl. No.: 563,596

[52] U.S. Cl. .............................. 356/218; 356/224
[51] Int. Cl.² ........................................ G01J 1/42
[58] Field of Search ........... 356/218, 224, 226, 186; 324/132; 331/DIG. 1

[56] References Cited
UNITED STATES PATENTS
| | | | |
|---|---|---|---|
| 3,336,481 | 8/1967 | Nelson | 356/186 |
| 3,369,447 | 2/1968 | Gallaway et al. | 356/96 |
| 3,753,388 | 8/1973 | Toyoda | 356/218 |

Primary Examiner—John K. Corbin
Assistant Examiner—Stewart Levy
Attorney, Agent, or Firm—C. Michael Zimmerman

[57] ABSTRACT

A laser power meter is described which enables the direct measurement of the output power of lasers over a full range of differing beam wavelengths. The laser power meter includes not only the photocell for intercepting a laser beam and the needle-scale meter conventionally provided, but also calibration means for simple adjustment of the meter to provide a correct power reading irrespective of the wavelength of the beam whose power is being measured. The calibration means includes first and second pluralities of resistors which are selectively connected in series between the photocell and the needle-scale meter by switches which are calibrated in nanometers. A user of the device is able to obtain a true reading of the power in a laser beam merely by "dialing in" the wavelength of the beam and selecting the proper power range for the needle-scale meter.

6 Claims, 3 Drawing Figures

LASER POWER METER

BACKGROUND OF THE INVENTION

The present invention relates to lasers and, more particularly, to a laser power meter for measuring the power in a laser beam or the like.

Presently, the only practical way of determining the output power of a laser is by empirically measuring the power in its beam. To this end, power meters have been designed for intercepting the output beam of a laser and providing a reading representative of its power. In general, such power meters include a solid state photocell, generally a silicone solar cell, which generates an electrical output potential in response to the interception of a laser beam. The potential is then fed to an indicator, such as the needle of a meter, which will register the power as a function proportional to the value of such electrical potential.

The difficulty with power meters presently available for such purpose is that the response of the sensors used in them is dependent on the wavelength (typically measured in nanometers) of the intercepted beam, as well as on its power. The result is that changes in the electrical output potential of such sensor are not proportional to power changes, and power meters consequently can provide a true reading of power only at a specified wavelength rather than over the full range of wavelengths which might be encountered in different output beams of, for example, dye or ion lasers. Because photocells which are not wavelength dependent are not yet available, makers of laser power meters have provided users with correction curves or multiplication factors which enable the users to extrapolate to other wavelengths, a power reading for a wavelength for which the power meter is designed. The necessity of using correction curves or multiplication factors makes it inconvenient to use a power meter to measure the power of any laser beam having a significantly different wavelength than that for which the power meter is designed.

SUMMARY OF THE INVENTION

The present invention provides a laser power meter capable of directly indicating the power of a laser beam over a wide range of beam output wavelengths, thereby eliminating the necessity of using supplemental correction curves or multiplication factors to obtain a correct reading at other than a single wavelength. The power meter accomplishes this by including a calibration means between the beam sensing means and the indicator which provides adjustments for differing beam wavelengths. To this end, the calibration means includes first and second pluralities of resistors; a first switch for connecting one or more of the resistors of the first plurality between the sensing means and indicator means to provide a first resistance therebetween having a value selected to pass a potential value to the indicator generally in the proximity of the actual potential which would cause the indicator to register the true output power of a laser beam having a chosen wavelength; and second switching means for also connecting one or more of the resistors of the second plurality of resistors between the sensor and indicator which, when combined with the selected first resistor, passes a potential to the indicator having a value equal to that causing a true registration by the indicator of the power of the laser beam. Thus, by appropriately adjusting the switches to provide a resistance representative of a desired wavelength, an electrical potential will be directed to the indicator which will cause the latter to provide a true reading of the output power of the laser beam, irrespective of the wavelength of such laser beam.

Most desirably, the switches are dialing switches which are manipulatable by an operator to "dial in" the wavelength in nanometers of a laser beam whose power is to be measured. In this connection, the values chosen for the resistors are selected relative to the remainder of the circuitry to provide incremental corrections corresponding to incremental differences in wavelength. Such incremental corrections correspond to unit changes in wavelength on the nanometer scale to provide the meter with full versatility over its useful range. The incremental corrections are provided by including pluralities or banks of resistors which enable an operator to dial into the meter the hundred, ten and one units in nanometers of the wavelength of a beam whose power is to be measured. In the preferred embodiment, the number of resistors which are required to obtain true readings is significantly decreased by selecting the relative values of the first and second pluralities so that each of the resistors of the second plurality are usable in providing many different total resistance values.

The above features and advantages, as well as additional advantages and features of the invention will be described or will become apparent from the following more detailed description of a preferred embodiment of the invention.

BRIEF DESCRIPTION OF THE DRAWINGS

With reference to the accompanying two sheets of drawing:

FIG. 3 is a graph illustrating the manner in which the preferred embodiment of the invention compensates for the dependency of the electrical output potential of the power meter sensor on beam wavelengths.

DETAILED DESCRIPTION OF A PREFERRED EMBODIMENT

Figure 1:
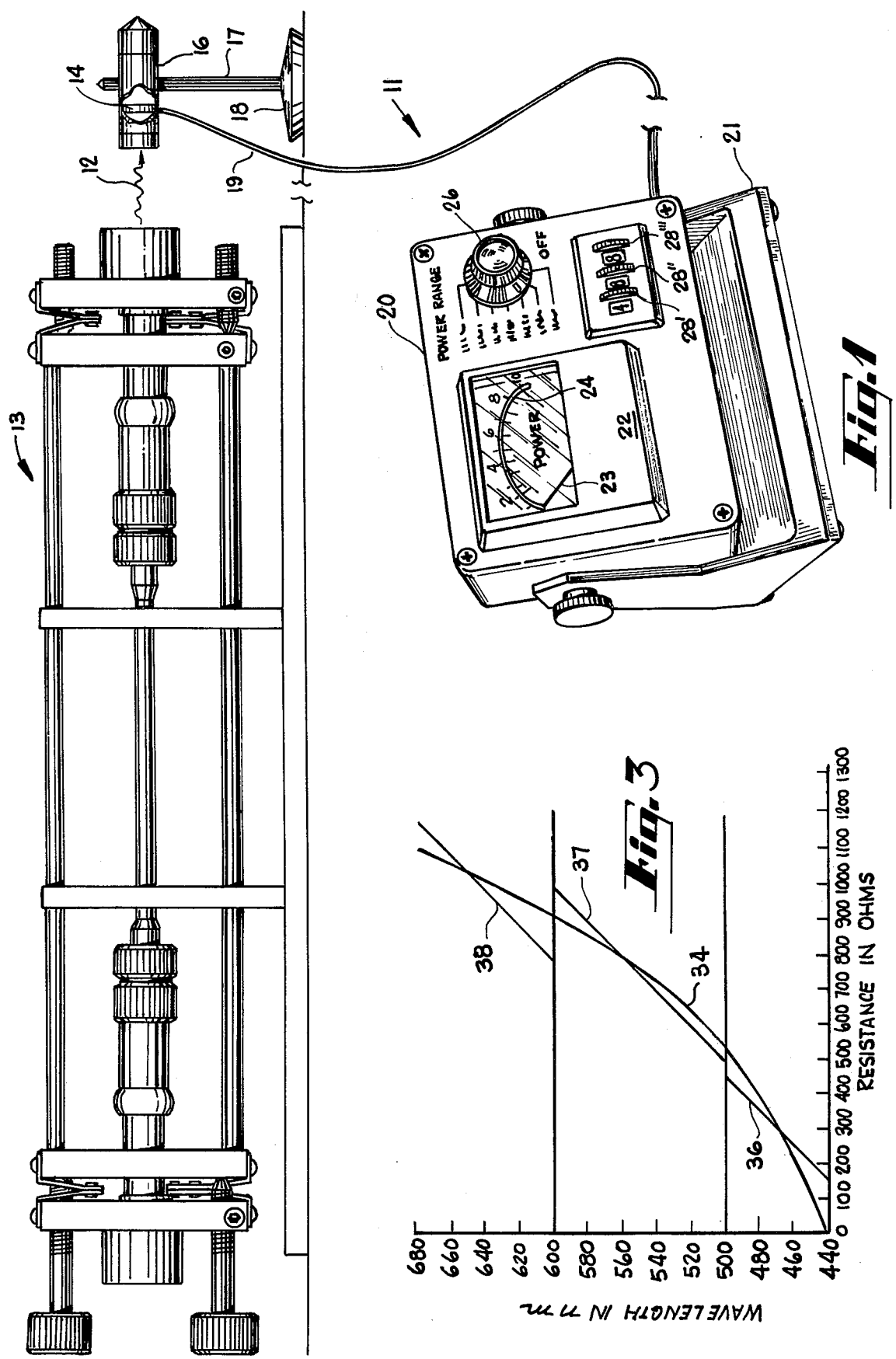
FIG. 1 is a perspective and elevation view of a preferred embodiment of the laser power meter of the invention, shown in position to measure the power in the output beam of a laser.

With reference first to FIG. 1 of the drawing, a laser power meter, generally referred to by the reference numeral 11, is illustrated properly positioned to measure the power in an output beam 12 emanating from a laser 13. Although the specific laser 13 illustrated is an ion laser, such as that disclosed in my U.S. Pat. No. 3,864,029, the disclosure of which is hereby incorporated by reference, it will be recognized by those skilled in the art that either the power meter 11 or another power meter incorporating the principles of the invention can be used to measure the power in beams from other types of lasers or, for that matter, power in other electromagnetic radiation.

The power meter 11 includes sensing means responsive to the interception of the output beam 12 by generating an electrical output potential having a value dependent upon both the power and the wavelength of the intercepted beam. To this end, a conventional solid state photocell energy convertor 14 of, for example, the type commonly referred to as a "solar cell" is mounted within a casing 16. Casing 16 is, in turn, slidably received on a post 17 which projects upwardly from a base 18 to provide, in effect, a stand for the photocell. The height at which the photocell 14 is maintained is thus adjustable to properly position the same for reception of a beam through an opening at the front of the casing 16 for impingement on the cell 14. The electrical output potential generated by the solar cell in response to receipt of the output beam of a laser is fed via a cord 19 to a rectangular casing 20 housing calibration and indicator means. As illustrated, casing 20 is trunnioned on a carriage stand 21 providing convenient access and use.

The indicator means is in the form of a meter 22 having a deflection needle 23 which indicates a power reading on a scale 24. The reading range of the scale 24 represents only a segment of the full power range which the meter is designed to indicate. The power meter therefore also includes range selector means for determining the power range segment to which the meter is correctly responsive. While the substantive aspects of the range selector will be defined in more detail hereinafter in connection with the description of FIG. 3, it should be noted that a range selector switch knob 26 is mounted adjacent an appropriate scale on the face of the meter to enable an operator to easily select a power range as will be discussed later.

As previously mentioned, the electrical potential generated by a photocell of the type typically used in laser power meters has a value dependent not only on the power of the intercepted beam, but also on its wavelength. On the other hand, electrical indicators, such as the needle-scale meter 22, generally provide registration as a function proportional to the value of an electrical potential applied thereto. The result has been that past laser power meters using photocell detectors have not directly provided true power readings for more than a few specified wavelengths for which they are specifically designed. In contrast, the laser power meter of the invention is designed to provide a direct reading of the output power of a laser beam over a wide range of beam wavelengths. Although the calibration means of the invention responsible for this feature will be described in more detail in connection with FIG. 3, it should be here noted that the face of the casing 20 has a plurality of thumb wheel dialing switches 28 on its face. As will be discussed, such switches are so connected with the calibration means that an operator can easily "dial in" the wavelength of a laser beam whose power is to be measured so that the reading of the power meter will be correct. That is, such wavelengths are normally measured in nanometers, and by dialing the hundreds unit (thumb wheel 28'), the tens unit (thumb wheel 28''), and the ones unit (thumb wheel 28''') of the wavelength of the beam whose power is to be measured, the correct calibration will be fed into the circuitry to remove the wavelength factor from the electrical potential fed to the needle-scale meter 22.

Figure 2:
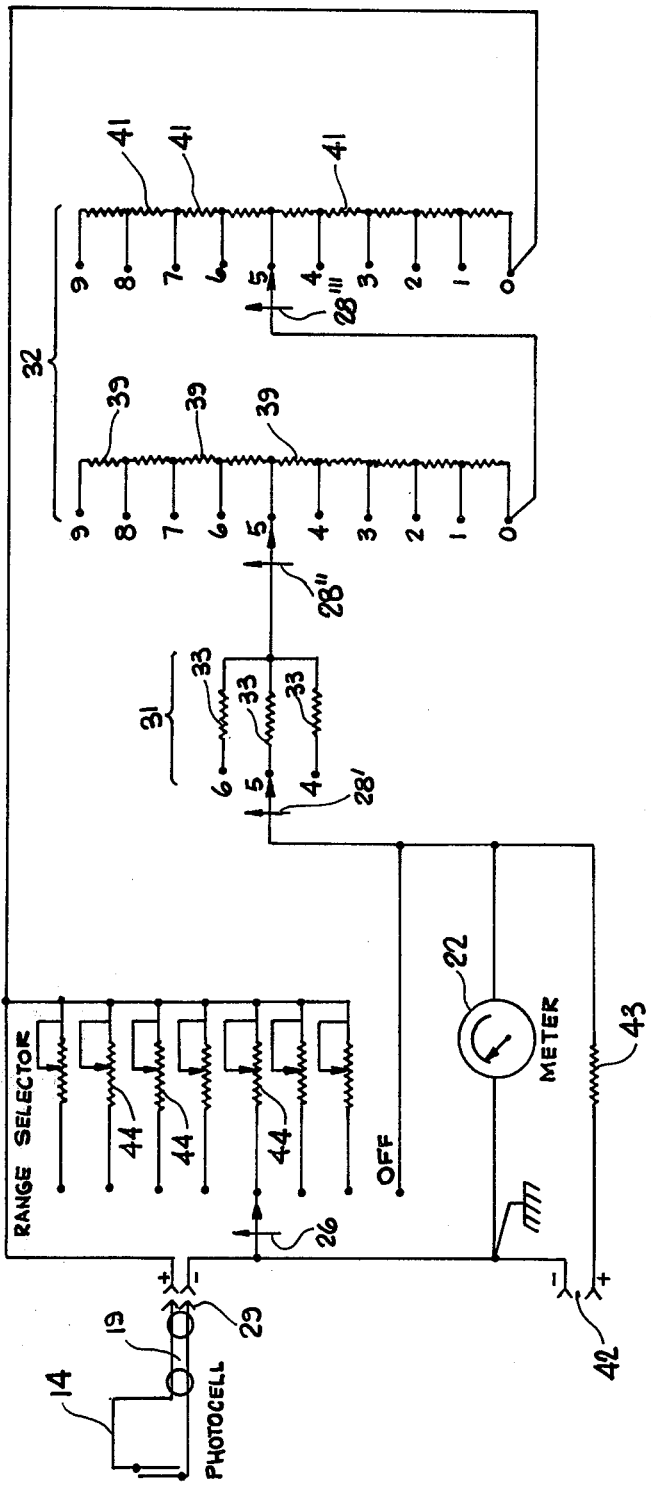
FIG. 2 is an electrical circuit diagram of the laser power meter of the invention.

FIG. 2 illustrates the calibration circuitry of the invention in combination with the other operating components thereof discussed above. More particularly, photocell sensor 14, switches 18, cord 19, scale needle meter 22 and switch 26 are referred to schematically in FIG. 2 by the same reference numerals used in FIG. 1. As illustrated, a jack socket connection 29 is provided for connecting the sensor cell and the cord to the remainder of the circuitry of the power meter.

Calibration means are positioned between the photocell 14 and needle-scale meter 22 to pass an electrical potential to the indicator having a value proportional to the output power of any laser beam intercepted by the sensor, irrespective of the wavelength of such laser beam. That is, the photocell 14 is connected in series to the meter 22 through pluralities of resistors and switches. For purposes of this description, the resistors are divided into first and second pluralities, generally referred to by the reference numerals 31 and 32, respectively. As shown, there are three resistors 33 in the plurality 31 which are individually connectable in series between the photocell and the meter by the switch 28'. The values of each of the resistors 33 are selected to represent individually those wavelength range segments in each century of wavelengths in nanometers in the full wavelength range of interest. As a practical matter, the wavelength output of lasers producing visible radiation varies between about 440 nm and 680 nm. Therefore, there are three resistances 33 respectively representing the 400, 500, and 600 wavelength segments of the 440-680 wavelength ranges. As illustrated, thumb wheel switch 28' is connected in the circuitry so that any selected one of the resistors 33 is placed in series between the meter and photocell by being rotated.

It has been found that if the values of the resistances 33 are appropriately chosen relative to the total resistance needed to provide accurate readings, an acceptable approximation of true power readings can be obtained over the full range of wavelengths without separate resistors having to be provided for each and every wavelength. That is, if the values of the three resistors 33 are properly selected for all three wavelength range segments — 400, 500 and 600 nanometers — the same resistors of the second plurality can be used in all three wavelength segments to indicate the tens and ones units throughout the full 440-680 nm wavelength range. For a better understanding of this, reference is made to FIG. 3 which shows a curve 34 providing the empirically determined wavelength dependency of photocell output, following typical values of resistances required in the circuitry to correct the output of the photocell to eliminate the wavelength variation component. As illustrated curve 34 generally is a hyperbolic section. It would be necessary to provide individual resistances for each nanometer wavelength in order to exactly follow curve 34. However, a good approximation of such curve is obtained with the present invention by individually choosing the values of the resistances 33 to provide, in effect, a starting point for three approximation lines 36, 37 and 38 covering, respectively, the coterminous wavelength range segments 455-500 nm, 500-600 nm, and 600-680 nm. As illustrated, the starting points for the three lines 36, 37 and 38 and, hence, the values of the resistance 33 responsible for the same, are related to one another non-linearly. That is, one straight line cannot connect all three starting points. The slopes of the lines 36-38 are all the same and straight and are determined by the resistance values selected for each of the resistors 39 and 41 of the second plurality 32 of resistors. Resistors 39 are in a resistor section representing the decade units in nanometers, and resistors 41 are in a second section of resistors representing changes in the ones unit. As illustrated, such values are selected to provide the lines 36-38 with a slope which provides acceptable approximations in all of the wavelength segments.

The number of resistors 39 and 41 and their relative values are selected to provide the tens and ones units of wavelengths as aforesaid. That is, there are nine resistors in each section with the values of the individual resistors in each section being generally equal to one another, and the values of the resistors 41 being equal divisions of the values of each of the resistors 39. The result is that each of the resistors 39 represents a decade in the base ten scale. The values of the nine resistors 41 are selected to be one-tenth of the value of each of the resistors 39 so that each of such resistors 41 represents a unit in the base ten scale. The switches 28'' and 28''' respectively connect any selected number of the resistors 39 and 41 in series between the meter and photocell, along with the resistor chosen by the switch 28', to provide a total resistance value corresponding to an individual beam wavelength in the range.

Although the specific resistor values will vary depending upon the electrical potential generated by any selected photocell, other resistance within the circuitry, and the electrical potential response of a selected meter 22, typical values for the resistances are as follows:

1. Resistor 33 representing the 400 nanometer units  10 ohms
2. Resistor 33 representing the 500 nanometer units  750 ohms
3. Resistance 33 representing the 600 nanometer units  1100 ohms
4. Each resistance 39  80 ohms
5. Each resistance 41  8 ohms The spectral flatness (accuracy) obtained with the above values is as follows:

455 nm to 570 nm    +/- 5%
570 nm to 630 nm    +/- 10%
630 nm to 650 nm    +/- 5%
650 nm to 680 nm    +/- 10%

Accuracy within the above ranges is well within acceptable limits.

As another feature of the instant invention, it includes means for directing the calibrated electrical potential output of the meter to an external indicator, such as a strip chart recorder. That is, an output socket, represented at 42 in FIG. 2, is provided in parallel with meter 22. A high isolation impedance 43, e.g., a resistor having a value of 100K ohms, is provided between the output socket and the calibration means previously described for preventing any external indicator connected with the socket from materially affecting the operation of such calibration means.

As previously mentioned, the reading range of meter scale 24 represents only a segment of the full power range which is to be covered. This permits the meter to be adequately sensitive while being of compact size. The preferred embodiment of the invention therefore incorporates a power range selector of the type used with other laser power meters. That is, the switch controlled by the knob 26 selectively connects one of a plurality of resistors 44 having differing resistance values in shunt with the sensor for matching its electrical potential output with segments of the full power range desired to be indicated by the meter. The range selector is to be used as is conventional with diffusers or the like in front of the cell 14 to reduce the power in a beam to be measured by a predetermined amount prior to its impinging on the cell.

The values of each of the resistors 44 is individually adjustable as indicated for initial calibration. Moreover, the switch 26 is provided with an "off" position in which the needlescale meter 22 is shorted in order to protect the same during transit.

The convenience with which the present invention enables an operator to measure the power output of laser beams having differing wavelengths will be readily recognized from the above. Such convenience is, from a broad standpoint, made possible by the recognition that equal incremental resistance values can be used to represent two successive decades of wavelength range if the resistances of the third decade are appropriately chosen. Although the invention has been described in connection with a preferred embodiment, it will be appreciated by those skilled in the art that various changes and modifications can be made without departing from its spirit. For example, the switch 28' can be connected to serially add properly chosen resistances 33 to obtain the different resistance values desired for the first plurality of resistors, rather than to separately connect different resistors in the circuit to obtain such resistance values. And separate resistors whose values differ by incremental steps could be separately connected into the circuit by the switches 28'' and 28''' to provide the resistance values desired for the sections of the second plurality rather than resistors which are added together to obtain the values as described. In view of these and other modifications, it is intended that the scope of applicant's coverage be limited only by the terms of the claims and their equivalents.

What is claimed is:

1. A laser power meter for measuring the power of a laser beam or the like over a range of output wavelengths comprising:
   A. sensing means responsive to the interception of the output beam of a laser by generating an electrical output potential having a value dependent upon both the power and the wavelength of said intercepted beam;
   B. indicator means for registering power as a function proportional to the value of an electrical potential applied thereto; and
   C. calibration means responsive to receipt of the output of said sensing means by passing an electrical potential to said indicator means; said calibration means including:
      1. first and second pluralities of resistors;
         a. said first plurality of resistors being selected to provide first resistance values between said sensing means and said indicator means, each of which resistance values responds to the receipt by said sensing means of a laser beam having a wavelength at the starting point of a chosen one of correspondingly successive segments of said wavelength range by passing a potential to said indicator means having a value in the proximity of the potential value causing said indicator means to register the true power of a laser beam having a wavelength representative of said starting point;
         b. said second plurality of resistors being divided into first and second sections respectively providing ten and unit decimal resistance value selection, said resistance values being related to successive wavelength measurement values in a straight line function having a slope which approximates the slope in all of said wavelength segments of the actual relationship of resistance values to wavelength measurement values which would cause said indicator means to register the true power of laser beams received by said sensing means having said wavelengths; and c. said starting points of said successive wavelength segments provided by said first plurality of resistors being selected at changes in the hundreds unit of a measurement of wavelengths within said wavelength range, the relationship of successive resistance values provided by said first plurality of resistors being related non-linearly to corresponding wavelength measurement values;

2. first switching means for connecting between said sensing means and said indicator means one or more of the resistors of said first plurality of resistors to provide a selected one of said first resistance values defining a chosen one of said successive wavelength range segments; and 3. second switching means including first and second switches respectively associated with said first and second sections of resistors of said second plurality of resistors for also connecting between said sensing means and said indicator means resistors of said sections to select digitally the beam wavelength in the chosen one of said wavelength range segments to which said sensing means will respond by passing a potential to said indicator means having a value generally equal to the potential value causing a true registration by said indicator means of the power of said laser beam, whereby said calibration means is adjustable on a decimal scale to pass an electrical potential from said sensing means to said indicator means having a value proportional to the output power of a laser beam received by said sensing means, irrespective of the wavelength of said laser beam.

2. The laser power meter of claim 1 wherein said sensing means is a solid state photocell energy converter.

3. The laser power meter of claim 1 wherein said indicator means is a meter having a reading range which is a segment of a full power range desired for said indicator, and range selector switching means are provided for selectively connecting differing resistance values in shunt with said sensing means for matching the electrical potential output of said sensing means to said meter range segment.

4. The laser power meter of claim 1 further including an output socket for directing the electrical potential output of said calibration means to an external indicator, and an isolation impedance connected between said output socket and said calibration means for preventing any external indicator connected with said socket from materially affecting the operation of said calibration means.

5. The laser power meter of claim 1 wherein there are nine resistors in each of said first and second sections to provide two successive decades of resistance value selection, each unit of which is representative of an output beam wavelength in each wavelength range segment selectable by said first switching means.

6. The laser power meter of claim 1 wherein said first switching means and said first and second switches of said second switching means are dialing switches manipulatable by an operator of said power meter to dial in the wavelength in nanometers of a laser beam whose power is to be measured.

* * * * *